United States Patent [19]

Rudich, Jr.

[11] 4,266,257
[45] May 5, 1981

[54] MOTOR OVER-HEATING PROTECTION CIRCUIT

[75] Inventor: George Rudich, Jr., Goshen, Ind.

[73] Assignee: Johnson Controls, Inc., Milwaukee, Wis.

[21] Appl. No.: 947,569

[22] Filed: Oct. 2, 1978

[51] Int. Cl.³ .......................... H02H 7/08; H02H 5/04
[52] U.S. Cl. ........................................ 361/27; 361/106
[58] Field of Search ...................... 361/27, 25, 106, 22, 361/24, 103, 23

[56] References Cited

U.S. PATENT DOCUMENTS

| 3,457,460 | 7/1969 | Buiting et al. | 361/27 |
| 3,794,858 | 2/1974 | Squiers | 361/106 X |
| 3,909,675 | 9/1975 | Hirsbrunner et al. | 361/27 X |
| 4,028,593 | 6/1977 | Newell | 361/27 |
| 4,075,674 | 2/1978 | Squiers et al. | 361/27 |

OTHER PUBLICATIONS

"I.C. Timer Plus Thermister Can Control Temperature" by Donald Dekold Electronics, Jun. 21, 1973, pp. 128 and 129.

Primary Examiner—Patrick R. Salce

Attorney, Agent, or Firm—Emrich, Root, Lee, Brown & Hill

[57] ABSTRACT

A motor overheating protection circuit includes an enabling circuit which responds to a trigger signal provided by a reset circuit upon application of power to the protection circuit to enable a motor drive circuit to effect energization of the motor. A temperature sensing circuit provides a control signal indicative of the temperature of the motor, and should the control signal exceed the set point of a threshold detecting circuit of the enabling circuit, indicative of overheating of the motor, the enabling circuit inhibits the motor drive circuit deenergizing the motor. Once the motor has been deenergized as the result of an overheating condition, the reset circuit maintains the enabling circuit locked out until the protection circuit is deactivated and then reactivated. If the sensor or its input leads are open, then the control signal provided by the temperature sensing circuit will exceed the detection threshold of the threshold detecting circuit and the enabling circuit will maintain the motor deenergized. If the sensor or its input leads are short circuited, then the control signal provided by the temperature sensing network will be less than the threshold level for a minimum voltage detector circuit of the enabling circuit and the enabling circuit will maintain the motor deenergized.

5 Claims, 2 Drawing Figures

MOTOR OVER-HEATING PROTECTION CIRCUIT

BACKGROUND OF THE INVENTION

1. Field of the Invention

This invention relates to motor protection circuits of the type which respond to an overheating condition of a motor as sensed by a temperature sensor and effect the deenergization of the motor, and more particularly to a motor protection circuit which detects both open and short circuit conditions for the temperature sensor and prevents energization of the motor.

2. Description of the Prior Art

Known motor overheating protection circuits typically employ a variable resistance device, such as a thermistor embedded in the windings of the motor, to sense overheating of the motor windings and effect deenergization of the motor to prevent the windings from burning out. The thermistor is connected in a resistive bias network to generate a control signal which increases in correspondence with an increase in the motor temperature. A detecting circuit monitors the control signal and effects deenergization of the motor whenever the control signal reaches a set point value indicative of overheating of the motor. Since the detecting circuit is designed to respond only to an increase in the control signal, then any fault of the temperature sensor resulting in a decrease in the control signal would go undetected. For example, when a PTC thermistor is used, the detecting circuit would not respond to a short circuit condition for the thermistor or the wires which connect it to the detecting circuit. Conversely, when an NTC thermistor is used, the detecting circuit would not respond to an open circuit condition for the thermistor or its input wires.

SUMMARY OF THE INVENTION

The present invention provides a motor overheating protection circuit which controls the application of power to a motor and which not only deactivates the motor for overheating of the motor but also prevents energization of the motor for a fault condition, including both open and short circuit failures of its temperature sensor and/or its input leads. The circuit also locks out following its deactivation of the motor for an overheating condition, preventing the motor from being reenergized automatically when the motor has cooled down.

The motor overheating protection circuit comprises an enabling circuit which responds to control signals provided by an input circuit to enable a motor drive circuit for connecting AC power to a motor. The input circuit includes a reset circuit which controls the enabling circuit to effect initial energization of the motor following activation of the protection circuit, and a temperature sensing circuit, comprised of a temperature sensor and a sensor bias network, which controls the enabling circuit to effect deenergization of the motor should the motor overheat.

Upon activation of the protection circuit, the reset circuit generates a trigger signal which is applied to the enabling circuit which responsively enables the motor drive circuit to effect energization of the motor. The temperature sensing circuit provides a control signal indicative of the temperature of the motor, and the control signal is applied to a threshold detecting circuit of the enabling circuit which permits the motor to be maintained energized as long as the protection circuit is activated and the temperature of the motor is below a maximum predetermined value.

As the motor heats up during its operation, the resistance of the sensor will also increase, providing a corresponding increase in the control signal. Should the control signal exceed the set point of the threshold detecting circuit, indicative of overheating of the motor, the enabling circuit inhibits the motor drive circuit causing the motor to be deenergized. In accordance with a feature of the invention, once the motor has been deenergized as the result of the detection of a overheating condition by the sensor, the reset circuit maintains the enabling circuit locked out until the protection circuit is deactivated and then reactivated.

In accordance with the invention, the enabling circuit prevents energization of the motor for open and short circuit fault conditions for the sensor or its input leads. If the sensor or its input leads are open, then the control signal provided by the temperature sensing network will exceed the detection threshold of the threshold detecting circuit, preventing the enabling circuit from effecting energization of the motor in response to the trigger signal provided by the reset circuit. If the sensor or its input leads are short circuited, then the control signal provided by the temperature sensing network will be less than the threshold level for a minimum voltage detector circuit of the enabling circuit and the enabling circuit will maintain the motor deenergized.

DESCRIPTION OF A PREFERRED EMBODIMENT

Figure 1:
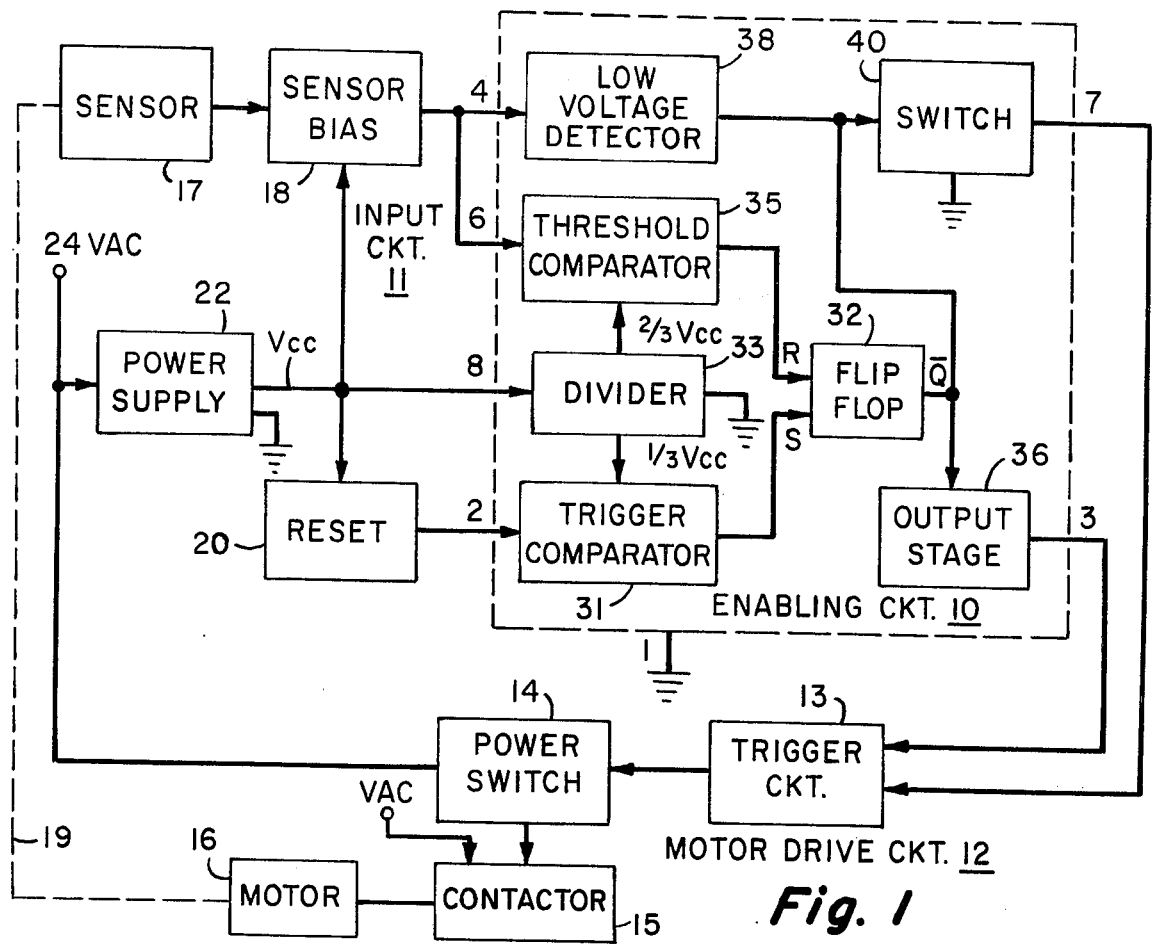
FIG. 1 is a block diagram of a motor overheating protection circuit provided by the present invention; and, FIG. 2 is a schematic circuit and partial block diagram of the protection circuit shown in FIG. 1.

Referring to FIG. 1, the motor protection circuit includes an enabling circuit 10 which responds to control signals provided by an input circuit 11 to enable a motor drive circuit 12 for connecting AC power to a motor 16, which for example may be a compressor motor for a residential air conditioner unit.

The input circuit 11 includes a motor temperature sensing circuit, which is comprised of temperature sensor 17 and sensor bias network 18, and a reset circuit 20. The reset circuit 20 controls the enabling circuit 10 to effect initial energization of the motor following activation of the protection circuit, and the temperature sensing circuit controls the enabling circuit to effect deenergization of the motor should the motor overheat.

The temperature sensor 17 comprises a thermistor which is embedded in the windings of the motor 16, as represented by the dashed line 19 shown interconnecting the sensor 17 and the motor 16. A positive temperature coefficient thermistor is used so that its resistance increases with an increase in the temperature of the motor windings. The sensor 17 enables the sensor bias network 18 to provide a signal indicative of the temperature of the motor windings for the enabling circuit 10. The input circuit 11 further includes a power supply circuit 22 which derives a DC signal VCC from the AC line signal for the enabling circuit 10, the sensor bias network 18 and the reset circuit 20.

The motor drive circuit 12 includes a trigger circuit 13, a power switch 14 and a contactor 15. The trigger circuit 13 responds to an enabling signal provided by the enabling circuit 10 to operate the power switch 14 to energize the contactor 15. When energized, the contactor 15 connects AC power to the motor 16.

The protection circuit is normally deenergized and upon application of power at 24VAC to the protection circuit, the reset circuit 20 generates a trigger signal which is applied to the enabling circuit 10. The enabling circuit 10 responsively provides a signal for enabling the trigger circuit 13 to effect energization of the contactor 15 via power switch 14 to apply a suitable AC signal to the motor 16. The AC signal may be 120VAC or 240VAC of single or multiple phase depending on the contactor and motor used. Once the motor is energized, control of the enabling circuit 10 is transferred to the temperature sensing circuit which permits the motor to be maintained energized as long as the protection circuit is activated and the temperature of the motor is within a predetermined range.

Should the motor overheat, the increase in temperature of the motor causes a corresponding increase in the resistance of the thermistor 17 so that the signal output of sensor bias network 18 inhibits the enabling circuit 10. This causes the enabling circuit 10 to deenergize the contactor 15 thereby disconnecting power from the motor 16. In accordance with the invention, once the motor 16 has been deenergized as the result of the detection of an overheating condition by the sensor 17, the reset circuit 20 maintains the enabling circuit 10 locked out until the protection circuit is deactivated and then reactivated. In addition, the enabling circuit 10 also responds to both open and short circuit fault conditions for the thermistor or its leads, and prevents energization of the motor 16.

Considering the protection circuit in more detail, the enabling circuit 10 comprises a commercially available type 555, IC timer circuit. The elements of the timer circuit are represented by the functional blocks contained within the dashed line, and the input and output terminals of the enabling circuit have been given the same designations as those of the commercially available timer circuit.

The enabling circuit 10 includes a trigger comparator circuit 31 having its input at pin 2 connected to the output of the reset circuit 20. The enabling circuit also includes a threshold comparator circuit 35 and a low voltage detector circuit 38 having respective inputs at pins 6 and 4 commonly connected to the output sensor bias network 18. The trigger comparator circuit 31 and the threshold comparator circuit 35 control the state of a flip flop 32 of the enabling circuit which in turn controls an output stage 36 of the enabling circuit causing its output at pin 3 to go high whenever the flip flop is set and to go low whenever the flip flop 32 is reset. The low voltage detector 38 controls a switch circuit 40 of the enabling circuit which controls the output stage 36 to cause its output to go low upon detection of a minimum threshold voltage by the low voltage detector circuit 38. The enabling circuit 10 is energized by a DC signal VCC, provided by power supply circuit 22, which is supplied to the power input at pin 8 of the enabling circuit 10 which has its reference input at pin 1 connected to ground.

The trigger comparator circuit 31 compares the signal output of the reset circuit 20 with a reference voltage at a level $\frac{1}{3}$ VCC provided by a resistive voltage divider circuit 33 of the enabling circuit, and provides an output to set the flip flop 32 when the output of the reset circuit 20 is less than $\frac{1}{3}$ VCC which is the case when power is initially applied to the protection circuit. When the flip flop 32 is set, the signal output of the output stage 36 goes high, causing trigger circuit to generate a trigger signal to turn on the power switch 14. When the power switch 14 is on, the contactor 15 is energized and power is applied to the motor 16.

The threshold comparator circuit 35 compares the signal output of the sensor bias network 18 with a further reference voltage at a level $\frac{2}{3}$ VCC provided by the voltage divider network 33 and resets the flip flop 32 whenever the signal output of the sensor bias network 18 is equal to or greater than $\frac{2}{3}$ VCC, indicative of overheating of the motor 16 or an open circuit condition for the thermistor 17 or its input leads. Should the thermistor be open circuited at the time the protection circuit is activated, the threshold comparator 35 will prevent setting of flip flop 32.

The low voltage detector circuit 38 responds to a signal level output of the bias network less than a preselected threshold value, for example 0.4 volts, which is indicative of a short circuit condition for the thermistor 17 or its input leads, to enable the switch circuit 40 which causes the output of the enabling circuit to go low. If the thermistor 17 or its input leads are short circuited, the low voltage detector 38 maintains the output of the enabling circuit low when the protection circuit is activated.

Figure 2:
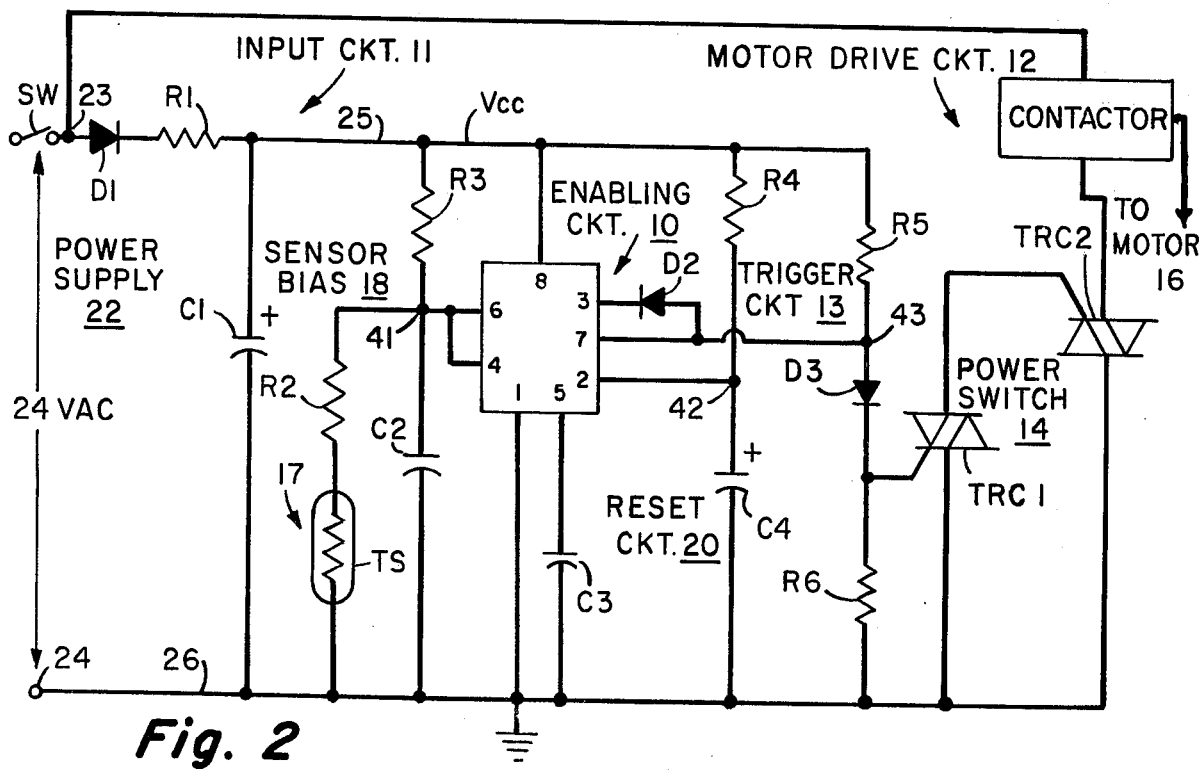

Considering the input circuit 11, with reference to FIG. 2, the power supply circuit 22 is formed by a diode D1, a resistor R1 and a capacitor C1. The protection circuit is activated when 24VAC is applied to input terminals 23 and 24 of the protection circuit by way of a switch SW and a power transformer (not shown). Switch SW may be manually operable or thermostatically controlled depending upon the application. The AC signal is half wave rectified by diode D1, providing a DC voltage between conductors 25 and 26 which is impressed upon the capacitor C1 connected therebetween. Resistor R1 limits the peak voltage VCC to which the capacitor charges. The load seen by capacitor C1 is essentially constant so that the voltage and ripple content on the capacitor C1 does not change appreciably when the output stage 36 switches between its on and off states.

The sensor bias circuit 18 comprises resistors R2 and R3 which are connected in series with the thermistor 17 between the conductors 25 and 26. The threshold input pin 6 and the reset input pin 4 of the enabling circuit 10 are commonly connected to the junction of resistors R2 and R3 at point 41. A capacitor C2 is connected between point 41 and the ground conductor 26. By way of example, the values for resistors R2 and R3 may be 270 ohms and 7.15 Kohms, respectively, and the thermistor 17 may be selected to have a resistance TS between 600 and 14,000 ohms when the motor temperature is within the desired operating range. With these values selected for resistors R2 and R3, then when the motor temperature is within the desired range, the voltage level at a point 41, and thus at pins 4 and 6 will be less than $\frac{2}{3}$ VCC, the threshold level for the threshold comparator circuit 35, and at least 0.4 volts, the set point voltage for the low voltage detector 38. For such conditions, the output stage 36 will be set high in response to the trigger signal provided by the reset circuit 20.

The reset circuit 20 comprises a resistor R4 and a capacitor C4 which are connected in series between conductors 25 and 26. The junction of the resistor R4 and capacitor C4 at point 42 is connected to the trigger input at pin 2 of the enabling circuit. When power is initially applied to the protection circuit, the voltage on capacitor C4 is zero, and capacitor C4 charges to the same voltage as that on capacitor C1. As C4 begins to charge towards VCC, the trigger comparator circuit 31 is enabled to set flip flop 32. When capacitor C4 is fully charged, it remains charged as long as the circuit remains energized. Thus, the voltage level at pin 2 is maintained above ⅓ VCC preventing automatic reset of the enabling circuit 10. Stated in another way, pin 2 has no interaction with the sensing circuit, so that should the motor overheat, causing the sensor resistance TS to increase to a value greater than 14 Kohms, the output of the enabling circuit will go low deenergizing the motor. Then when the sensor resistor resistance decreases to a value less than 14 Kohms as the motor cools down, the reset circuit cannot retrigger the enabling circuit 10 since capacitor C4 maintains the voltage level at pin 2 above ⅓ VCC.

It is pointed out that the effect of the voltage on capacitor C4 is determined by the voltage that is impressed on pins 4 and 6 of the timing circuit. Stated in another way, the reset circuit 20 responds to the application of power to switch the output of the enabling circuit 10 high only if the signal output of the sensor bias network is within the preselected limits, that is, between 0.4 volts and ⅔ VCC. If the voltage on pins 4 and 6 is greater than ⅔ VCC, indicative of an open circuit condition for sensor 17, the output of the enabling circuit 10 is held low. If the signal level at pins 4 and 6 is less than 0.4 volts above ground, indicative of a short circuit condition for the sensor 17, the output of the enabling circuit is also held low.

Considering the motor drive circuit 12, the load trigger circuit 13 is formed by a resistor R5, a diode D3 and a resistor R6 which are connected in series between the conductors 25 and 26. The junction of resistor R4 and the anode of diode D3 at pin 43 is connected directly to the discharge output, pin 7, of the enabling circuit 10 and over a diode D2 to the output, pin 3, of the enabling circuit. A Triac TRC1 together with a Triac TRC2 form the power switch 14. Triac TRC1 is a sensitive gate low power Triac which responds to low current via trigger circuit, and Triac TRC2 is a less sensitive gate high power Triac which completes the power circuit to the contactor 15.

When the output of the enabling circuit 10 is high, diode D2 is reverse biased, permitting current to flow through resistor R5, diode D3, the resistor R6 providing a trigger signal at the gate of Triac TRC1. When conducting, Triac TRC1 provides a trigger signal to the gate of Triac TRC2 which conducts to complete the power circuit to the contactor 15. When the output of the enabling circuit is low, the output stage 36 sinks the current in resistor R5 to ground, bypassing diode D3 and resistor R6. The switch circuit 40 is also enabled and effectively grounds pin 7, augmenting the current sinking function of the output stage 36. This causes Triacs TRC1 and TRC2 to turn off, disconnecting power from the contactor.

Capacitor C2 provides noise filtering, and in conjunction with capacitor C3, also provides phase compensation, compensating for the large ripple voltage which exists on the unregulated power supply voltage VCC.

Operation

Referring to FIGS. 1 and 2, when switch SW is operated to its closed position, 24VAC is applied to input terminals 23 and 24 and current flows through diode D1, resistor R1 and capacitor C1 to charge capacitor to +VCC. Current also flows through resistor R3 and R2 and the thermistor 17 providing a potential at the threshold input pin 6 of the enabling circuit 10 indicative of the sensor resistance TS. Under normal conditions, the voltage level at pin 6 is equal to or greater than 0.4 volts, but less than ⅔ VCC.

Capacitor C4 also charges through resistor R4 and the capacitor C4 towards +VCC. Initially the signal level at pin 2 is less than ⅓ VCC and the trigger comparator circuit 31 sets the flip flop 32 which enables the output stage 36 so that the signal level on pin 3 goes high. This reverse biases diode D2, permitting current to flow through resistor R5, diode D3 and resistor R6, providing a trigger signal for Triac TRC1. Triac TRC1 turns on and triggers Triac TRC2 on to complete the power circuit for the contactor 15 which then operates to energize the motor 16.

Should the motor overheat such that the sensor resistance TS increases to a value greater than 14 Kohms, then as the resistance TS increases, the input voltage to the threshold comparator 35 also increases. When this input voltage equals ⅔ VCC, the threshold comparator 35 resets the flip flop 32. When flip flop 32 is reset, the output stage 36 causes pin 3 to go low, forward biasing diode D2. Also, switch circuit 40 is enabled causing pin 7 to be brought to near ground potential. Accordingly, the current through resistor R5 is bypassed to ground removing the trigger signal from the Triac TRC1 which is then cutoff. This cuts off Triac TRC2 to deenergize the contactor 15 which disconnects AC power from the motor 16. With the motor 16 deenergized, the motor windings will cool down, the thermistor resistance TS will eventually decrease to a value less than 14 Kohms. This causes a corresponding decrease in the input signal to the threshold comparator circuit 35. However, since capacitor C4 of the reset circuit 20 remains charged as long as the power is applied to the protection circuit, the potential at pin 2 is above ⅓ VCC so that the trigger comparator circuit 31 cannot set flip flop 32. Thus, the enabling circuit 10 is locked out, preventing energization of the motor, as long as the protection circuit remains energized.

If the sensor or its input leads are open circuited, or resistance TS is greater than 14 Kohms at the time the protection circuit is initially energized, the threshold input signal will be equal to or greater than ⅔ VCC and the threshold comparator circuit 35 will prevent flip flop 32 from being set. Accordingly, diode D2 is forward biased and switch 40 is operated preventing triggering of the Triacs. Thus, contactor 15 remains deenergized, preventing energization of the motor 16. Similarly should the sensor 17 or its input leads be short circuited, then when the protecting circuit is activated, the low voltage detector circuit 38 will enable switch 40 and the output stage 36 to maintain the output of the enabling circuit low, preventing energization of the motor 16.

When switch SW is operated to its open position, the motor contactor 15 is deenergized and disconnects power from the motor. Also, capacitor C1 discharges, predominately over a path including resistors R5 and R6 and diode D3. However, resistors R3, R2, thermistor TS and the integrated circuit 10 augment the discharge of the capacitor. Capacitor C4 subsequently discharges over these paths to prepare the protection circuit for the next operating cycle.

Having thus disclosed in detail a preferred embodiment of my invention, persons skilled in the art will be able to modify certain of the structure which has been disclosed and to substitute equivalent elements for those which have been illustrated; and it is, therefore, intended that all such modifications and substitutions be covered as they are embraced within the spirit and scope of the appended claims.

I claim:

1. In an overheating protection circuit for a motor, including switching means operable to connect power to the motor and sensing means for sensing the temperature of the motor, a control circuit for controlling the operation of said switching means comprising: sensor bias means connected in circuit with said sensing means for providing a control signal indicative of the temperature of said motor as sensed by said sensing means; enabling means having output means operable when enabled to provide a signal to effect the enabling of said switching means to connect power to said motor, including signal level detecting means operable when the amplitude of said control signal increases to at least a preselected value, indicative of over-heating of the motor, to disable said output means to thereby cause said switching means to disconnect power from said motor; reset circuit means for enabling said output means and including timing circuit means operable upon application of power thereto to generate a start signal defining an enabling interval, said reset circuit means preventing re-enabling of said output means after said enabling interval independent of the state of said enabling means following disconnection of power from said motor as the result of an over-heating condition, and for so long as power continues to be applied to said control circuit.

2. A protection circuit as set forth in claim 1 wherein said enabling means further comprises second signal level detecting means responsive to said control signal to enable said output means.

3. A protection circuit as set forth in claim 2 wherein said timing circuit means comprises a capacitor which charges in response to application of power to said reset means to generate said control signal which increases in amplitude during said enabling interval, said second signal level detecting means responding to said control signal only when its amplitude is less than a preselected value.

4. A protection circuit as set forth in claim 2 wherein said enabling means comprises reference means for generating first and second reference signals for said first and second signal level detecting means to define the response levels for said first and second signal level detecting means.

5. A solid state control circuit for providing overheating protection as well as open-circuit and short-circuit sensor protection to a motor comprising: sensor bias network means incorporating said sensor for generating a low level signal in the case of a sensor short circuit, and a signal having an amplitude of a predetermined first magnitude greater than said low level signal in the event of sensor overheating or open-circuit; reset circuit means responsive to the initial application of power for generating a start signal less than a predetermined second level for an enabling interval and thereafter remaining at a level above said predetermined second level as long as power is continued to be supplied to said control circuit; enable circuit means including bistable circuit means having a first output state generating an enable signal and a second output state generating a disable signal, said start signal of said reset circuit means being coupled to set said bistable circuit means to said first state, first voltage detector circuit means responsive to said sensor signal for setting said bistable circuit means to said second state in response to said sensor signal generated by overheating or an open-circuit sensor means; low voltage detector circuit means responsive to a sensor signal generated by a short circuit in said sensor means for clamping the output of said bistable circuit means in said second state, and output switch means responsive to the output signal of said low voltage detector circuit means for generating an output disable signal; and trigger circuit means for coupling power to said motor in response to said bistable circuit means being in said first output state and for de-energizing said motor in response to said second output state of said bistable circuit means and said output disable signal.

* * * * *